United States Patent [19]

Wilson

[11] 4,384,542

[45] May 24, 1983

[54] OUTRIGGER DEVICE

[76] Inventor: Gerald H. Wilson, 1712 SW. 24th St., Ft. Lauderdale, Fla. 33315

[21] Appl. No.: 181,885

[22] Filed: Aug. 27, 1980

[51] Int. Cl.³ ............................................. B63B 35/14
[52] U.S. Cl. .................................. 114/255; 114/270; 114/364; 43/27.4; 403/100
[58] Field of Search ............... 248/159, 538, 278, 299; 403/100, 102; 43/21.2, 27.4; 114/146, 255, 270, 221 R, 364; 9/1.1, 1.7

[56] References Cited

U.S. PATENT DOCUMENTS

| | | | |
|---|---|---|---|
| 2,038,143 | 4/1936 | Swanson | 403/102 |
| 2,049,807 | 8/1936 | Horsley | 248/159 |
| 2,727,707 | 12/1955 | Wells | 114/255 |
| 2,848,117 | 8/1958 | Miller | 248/538 |
| 3,484,978 | 12/1969 | Nakashima | 43/27.4 |
| 3,655,297 | 4/1972 | Bolen | 403/100 |
| 3,958,524 | 5/1976 | Cantley | 114/146 |

Primary Examiner—Trygve M. Blix
Assistant Examiner—D. W. Keen
Attorney, Agent, or Firm—Malin & Haley

[57] ABSTRACT

An outrigger device attachable to a flying bridge or a tower leg, comprising a hollow tubular member which is connected to the flying bridge or tower support member. The hollow tubular member has its proximal end connected to a system of brackets which allows pivotal movement of the tubular member about multiple axes. The system of brackets is connected to the flying bridge or tower support member, and includes a collapsible brace member connected between the support member and the tubular member. The system of brackets also includes a singular brace member connected between the flying bridge beneath the support member and the tubular member. When not in use, the outrigger device may be folded compactly against the flying bridge or tower leg adjacent the support member and held in place by a spring locking clamp.

6 Claims, 5 Drawing Figures

U.S. Patent
May 24, 1983
4,384,542
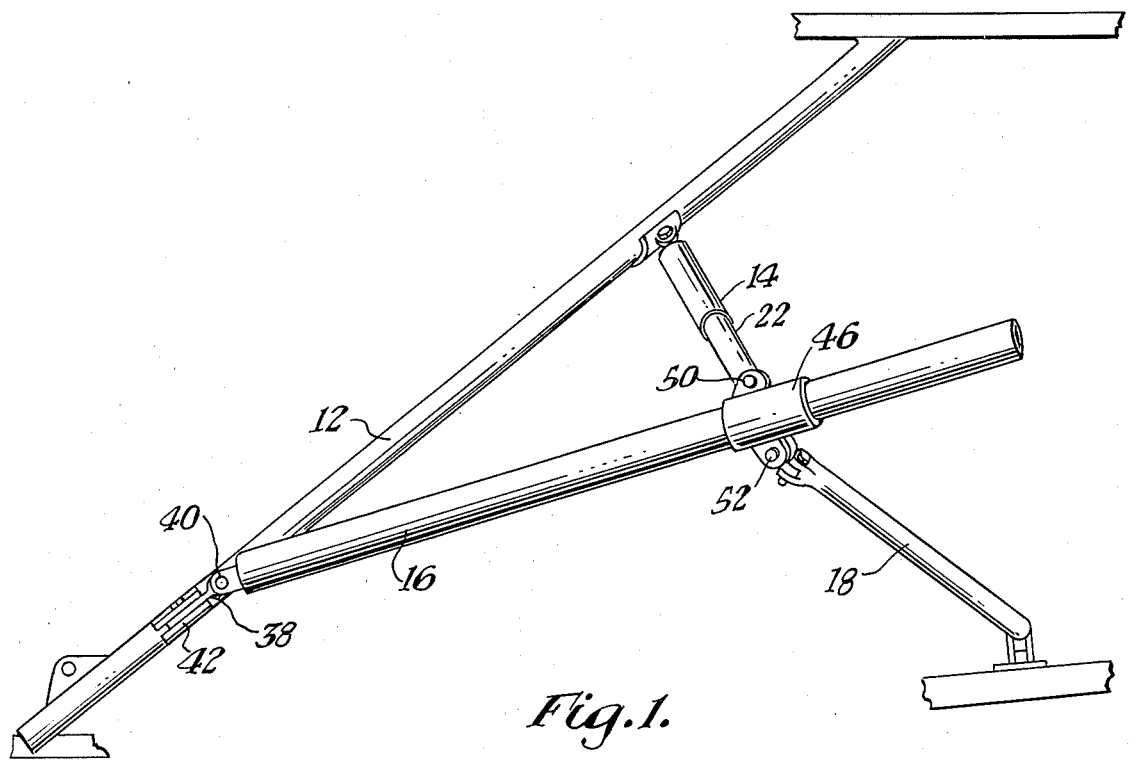
Fig.1.
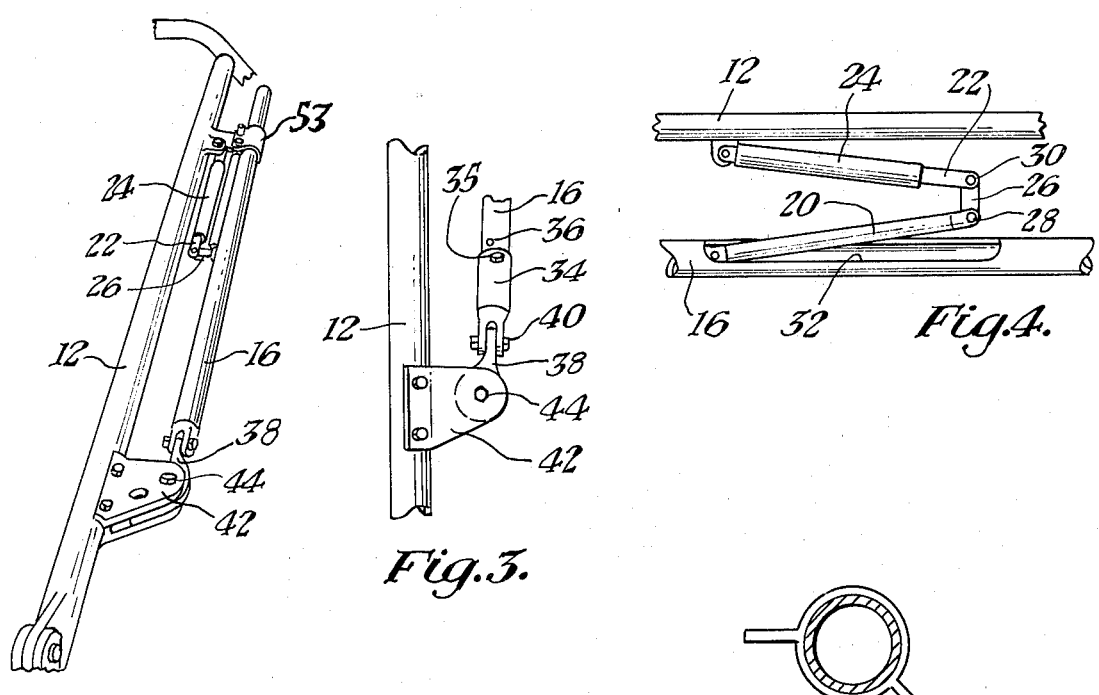
Fig.2.
Fig.3.
Fig.4.
Fig.5.

OUTRIGGER DEVICE

TECHNICAL FIELD

The present invention relates to fishing outriggers and more particularly to a foldable outrigger device for supporting an outrigger pole which is attachable to any flying bridge or tower leg.

BACKGROUND ART

In the past, there have been various fishing outriggers. By way of example is U.S. Pat. No. 2,727,707 in which a fishing outrigger is described. The fishing outrigger is mounted upon a flat vertical surface to swing backwardly against the surface, comprising a lower bracket, a socket connected at its lower end to the lower bracket to be movable about a horizontal and vertical axis, an upper bracket spaced from the lower bracket, an arcuate member unsupported at its lower end and with its upper end pivotally connected to the upper bracket to be movable in a horizontal arc extending rearwardly of said bracket, clamping means for connecting said socket at a desired point on said arcuate member and a movable latch at the upper end of the arcuate member to selectively engage the upper bracket and lock the pivotal connection and the arcuate member substantially at right angle to the surface.

The prior inventions have all been designed to be installed to a surface of the vessel such as the hull, or the cabin surface as in the cited reference. The present invention improves upon the prior art by providing a foldable or collapsible outrigger device which can be attached to a flying bridge or tower leg which is attached to the boat itself.

DISCLOSURE OF INVENTION

According to the present invention, a collapsible outrigger device attachable to a flying bridge or tower leg is provided. The invention comprises a hollow tubular member having its proximal end connected to a series of brackets which are in turn connected to a support member which is directly attached to the flying bridge or tower leg, so that the hollow tubular member is able to pivot about multiple axes. A collapsible brace member with one end connected to a tubular member at a position between the proximal end and the distal end of the tubular member. The other end of the collapsible brace member is connected to the support member. Also a singular brace member is connected between the hollow tubular member and a portion of the flying bridge or tower leg below the support member.

The tubular member or the support member may be grooved in order that a portion of the collapsible brace member may fit therein in order that when the hollow tubular member is folded adjacent the support member, it maintains a relatively close position with respect to the support member. The support member also has a connector or spring clamp member attached to its outer surface which grasps a portion of the collapsible support member when the unit is in the folded position.

The hollow tubular member is sized such that a trolling pole or outrigger pole may be placed in the distal end of the hollow tubular member whenever it is desired to troll for fish. The lower end of the hollow tubular member is connected through a series of brackets to the support member. The series of pivotally connected brackets enable the tubular member to be pivoted both upwardly and sidewardly when the hollow tubular member is either moved to the folded position of the outrigger device or opened to a functional position. The distal end of the hollow tubular member is supported by a collapsible brace member and a singular brace member.

The collapsible brace member includes two sections pivotally connected at the approximate mid-point of the collapsible brace member. When the collapsible brace member is in the fully open or extended position, a metal locking sleeve which is slidably connected to the collapsible base member is slid over the pivotal joining point or area of the two sections of the collapsible brace member to hold the collapsible base member in the fully extended or open position. One end of the collapsible brace member is pivotally connected to the support member, while the other end is pivotally connected to the tubular member.

A singular brace member having one end pivotally connected to the hollow tubular member and the other end pivotally connected to a portion of the flying bridge is also employed, to provide additional support to the device.

It is therefore an object of this invention to provide an outrigger device which is connectible to a conventional flying bridge or tower brace that is easily movable back and forth between an extendable and a collapsed position.

It is another object of this invention to provide an outrigger device which can be collapsed and folded out of the way into at least a partial internal position when not in use.

In accordance with these and other objects which will be apparent hereinafter, the instant invention will now be described with particular reference to the accompanying drawings.

BRIEF DESCRIPTION OF DRAWINGS

FIG. 1 is a side view of the outrigger device in an in use position.

FIG. 2 is a view from the left of FIG. 1 of the outrigger device in a collapsed position.

FIG. 3 is an enlarged partial view of a portion of FIG. 2.

FIG. 4 is an enlarged partial view of the collapsible brace member that moves into pocket 32.

FIG. 5 is a cross sectional view of the tubular member 16 below female bracket 46.

BEST MODE FOR CARRYING OUT THE INVENTION

Referring now to the drawings and particularly FIGS. 1 and 2, the outrigger device is shown generally at 10. The outrigger device 10 comprises a collapsible brace member 14, tubular member 16, and a second brace member 18.

The outrigger support member 12, is part of the frame of the flying bridge the outrigger device may be connected at any desired location. The tubular member 16 is positioned to fold out to support the trolling pole (not shown) in a proper position in relation to the boat. The support member 12 (not shown) or the tubular member 16 may be grooved (as shown in FIG. 4) so that when the outrigger device is not being used it can be folded close against the support member 12.

The collapsible brace member 14 includes a first section 20, a second section 22, and a slidably mounted sleeve 24, as shown in FIG. 4 the first section 20 is connected to the second section 22 by way of a connecting plate 26 having one end pivotally connected to the first section 20 by way of a pin 28 and having the other end pivotally connected to the second section 22 by way of a second pin 30. When the device is in the functional position or outermost position, the sleeve 24 is slid over the connecting plate 26 to place the first section 20 and the second section 22 in a rigid position, thus maintaining the tubular member 16 of the device in the functional position. In the fully collapsed position the first section 20 moves into a recession 32 in tubular member 16.

Now referring to FIG. 3, the universal joint which is used to connect the lower end of the tubular member 16 to the support member 12 includes a female bracket 34. The bracket 34 is slidably connected to the lower end of the tubular member 16. Bracket 34 is held in place by drilling a hole through both the tubular member 16 and the female bracket 34 and inserting a bolt 35 therein. One end of a double male bracket 38 is then mated with the exposed end of the female bracket 34. A pin 40 is used to connect bracket 34 with bracket 38. The other end of the double male bracket 38 is then connected to a second female bracket 42 which is mounted on and fixed to the support member 12. This end of the male plug is constructed such that its axis of rotation will be 90° disposed from the axis of rotation of the first female bracket 34. Another pin 44 is used to connect the second end of the double male bracket to the second female bracket 42. This enables the tubular member 16 to be moved in at least two different axis into its final preferred position.

The distal end of the tubular member 16 also has a dual female bracket 46 (see FIG. 1) connected thereabout. The second section 22 of the brace system 14 has one of its ends pivotally connected within one female bracket of the dual female bracket 46 by way of a pin 50. The remaining female bracket of the dual female bracket 46 is pivotally connected to an end of the singular brace member 18 also by way of a pin 52. These pivotal connections also aid in allowing the device to be collapsed towards the support member 12 when the device is not in use and retained by clamp means 53.

The instant invention has been shown and described herein in what is considered to be the most practical and preferred embodiment. It is recognized, however, that departures may be made therefrom within the scope of the invention and that obvious modifications will occur to a person skilled in the art.

INDUSTRIAL APPLICABILITY

The outrigger device can be sold commercially to be installed on the flybridges, tower legs or the like of boats.

I claim:

1. An outrigger device connectable to a non-planar, non-vertical structural member or surface of a flying bridge or tower leg of a boat for holding a trolling pole at a rearward angle from the boat, and offering quick and simple release feature from the bridge or tower member or surface, comprising:
a hollow, tubular member means connected to said non-planar, non-vertical structural member or surface of the flying bridge or tower leg for retaining a trolling pole or outrigger pole outward from the boat at a rearward angle, said tubular member means having a distal end and a proximal end;
bracket means connected to said proximal end for providing said tubular member means upward, sideward and rearward pivotal connection with said structural member or surface whereby said tubular member means can be moved from a collapsed position to a functional position;
collapsible brace means pivotally connected to said tubular member means and said structural member or surface for rigidly maintaining said tubular member means in a functional position angularly and rearwardly displaced from said boat or in a collapsed position generally parallel to the structural member or surface when not in use.

2. An outrigger device connectable to a non-planar, non-planar, non-vertical structural member or surface of a flying bridge or tower leg of a boat for holding a trolling pole at a rearward angle from the boat, and offering quick and simple release feature from the bridge or tower member or surface, comprising:
a hollow, tubular member means connected to said non-planar, non-vertical structural member or surface of the flying bridge or tower leg for retaining a trolling pole or outrigger pole outward from the boat at a rearward angle, said tubular member means having a distal end and a proximal end;
bracket means connected to said proximal end for providing the tubular member means upward, sideward and rearward pivotal connection with the said structural member or surface whereby said tubular member means can be moved from a collapsed position to a functional position;
collapsible brace means pivotally connected to said tubular member means and said structural member or surface for rigidly maintaining said tubular member means in a functional position angularly and rearwardly displaced from said boat or in a collapsed position generally parallel to the structural member or surface when not in use;
a singular brace means pivotally connected to said tubular member means for further bracing and supporting said tubular member means in said functional position.

3. An outrigger device as set forth in claim 2, wherein:
said bracket means includes a universal connection which allows movement of said tubular member means in at least two different planes.

4. An outrigger device as set forth in claim 2, further comprising:
a clamp means for retaining said outrigger device in a folded position parallel and adjacent to said structural member or surface.

5. An outrigger device connectable to a non-planar, non-vertical structural member or surface of a flying bridge or tower leg of a boat for holding a trolling pole at a rearward angle from the boat, and offering quick and simple release feature from the bridge or tower member or surface, comprising:
a hollow, tubular member means connected to said non-planar, non-vertical structural member or surface of the flying bridge or tower leg for retaining a trolling pole or outrigger pole outward from the boat at a rearward angle, said tubular member means having a distal end and a proximal end;
bracket means connected to said proximal end for providing the tubular member means upward, sideward and rearward pivotal connection with the said structural member or surface whereby said tubular member means can be moved from a collapsed position to a functional position;

collapsible brace means pivotally connected to said tubular member means and said structural member or surface for rigidly maintaining said tubular member means in a functional position angularly and rearwardly displaced from said boat or in a collapsed position generally parallel to the structural member or surface when not in use;

said collapsible brace means is a member having a second rigid section pivotally connected to said structural member or surface, a first rigid section pivotally connected to said tubular member means, and a sleeve means slidably mounted on one of said rigid sections;

said first rigid section pivotally connected to said second rigid section whereby said first rigid section can be folded against said second rigid section while both sections remain pivotally connected to said structural member or surface and said tubular member means;

said sleeve means being slidable over the point of connection of said first rigid section and said second rigid section to restrain said collapsible brace means in a fully extended position thereby maintaining said tubular member means at a rearward angular displacement from said boat.

6. An outrigger device as set forth in claim 5, wherein:

said tubular member means is grooved for receiving said first rigid section such that said tubular member means can be positioned close to said structural member or surface when said outrigger device is in the collapsed position.

* * * * *